United States Patent
Lalancette et al.

(10) Patent No.: US 11,021,411 B2
(45) Date of Patent: Jun. 1, 2021

(54) POTASSIUM MAGNESIUM FERTILIZER

(71) Applicant: KSM INC., Québec (CA)

(72) Inventors: Jean-Marc Lalancette, Québec (CA); David Lemieux, Québec (CA)

(73) Assignee: KSM INC., Quebec (CA)

( * ) Notice: Subject to any disclaimer, the term of this patent is extended or adjusted under 35 U.S.C. 154(b) by 88 days.

(21) Appl. No.: 15/975,664

(22) Filed: May 9, 2018

(65) Prior Publication Data

US 2018/0339949 A1    Nov. 29, 2018

(30) Foreign Application Priority Data

May 24, 2017    (CA) ................................ CA 2968257

(51) Int. Cl.
| | | |
|---|---|---|
| *C05D 1/02* | (2006.01) | |
| *C01D 5/02* | (2006.01) | |
| *C01D 5/12* | (2006.01) | |
| *C01F 5/40* | (2006.01) | |

(52) U.S. Cl.
CPC .................. *C05D 1/02* (2013.01); *C01D 5/02* (2013.01); *C01D 5/12* (2013.01); *C01F 5/40* (2013.01)

(58) Field of Classification Search
None
See application file for complete search history.

(56) References Cited

U.S. PATENT DOCUMENTS

| | | | | |
|---|---|---|---|---|
| 2,298,493 A | * | 10/1942 | Macintire | C01F 5/40 423/169 |
| 2,384,010 A | * | 9/1945 | Brandenburg | C01F 5/40 423/160 |
| 2,902,344 A | | 9/1959 | Cevidalli et al. | |
| 3,197,302 A | | 7/1965 | MacBride | |
| 3,423,171 A | | 1/1969 | Hoppe et al. | |
| 3,436,175 A | | 4/1969 | Atwood et al. | |
| 3,446,612 A | * | 5/1969 | Taylor | C05G 1/00 71/40 |
| 3,615,174 A | | 10/1971 | Lewis | |
| 3,726,965 A | | 4/1973 | Neitzel et al. | |

(Continued)

FOREIGN PATENT DOCUMENTS

| | | |
|---|---|---|
| CA | 521086 | 1/1956 |
| CA | 633571 | 12/1961 |

(Continued)

OTHER PUBLICATIONS

Big Quill Ressources Inc. Home Patent [on-line] [retrieve Jun. 23, 2011. Retrieved from the internet<URL: http://www.bigquill.com/index.html> (2011), 1 page.

(Continued)

*Primary Examiner* — Sheng H Davis
(74) *Attorney, Agent, or Firm* — Workman Nydegger

(57) ABSTRACT

A method for producing a double sulfate of potassium and magnesium by dry mechanical attrition of potassium sulfate and magnesium sulfate hexahydrate, comprising obtaining potassium sulfate by sulfatation of potash to bisulfate of potassium and disproportionation of the bisulfate of potassium to potassium sulfate in a water-methanol solution, and obtaining magnesium sulfate hexahydrate by sonic-assisted partial sulfatation of calcined serpentinic silicate.

6 Claims, 1 Drawing Sheet

(56) References Cited

U.S. PATENT DOCUMENTS

| | | | | |
|---|---|---|---|---|
| 3,758,287 | A | * | 9/1973 | Scheel ............... C05D 9/00 71/12 |
| 3,843,772 | A | * | 10/1974 | Boeglin ............... C01D 5/10 423/551 |
| 4,045,543 | A | * | 8/1977 | Sardisco ............... C01B 7/035 423/482 |
| 4,056,599 | A | | 11/1977 | Fox, III et al. |
| 4,195,070 | A | | 3/1980 | Allain et al. |
| 4,341,752 | A | | 7/1982 | Groenhof |
| 4,533,536 | A | | 8/1985 | Bichara et al. |
| 4,588,573 | A | * | 5/1986 | Worthington ........... C01D 5/00 423/552 |
| 4,707,347 | A | | 11/1987 | Vajna et al. |
| 4,848,675 | A | * | 7/1989 | Loeblich ............... C05D 1/02 241/3 |
| 5,102,441 | A | | 4/1992 | Zentgraf et al. |
| 5,549,876 | A | | 8/1996 | Zisner et al. |
| 6,171,358 | B1 | * | 1/2001 | Obrestad ............... C05C 5/04 71/58 |
| 6,315,976 | B1 | | 11/2001 | Phinney |
| 6,863,826 | B2 | | 3/2005 | Sheets |
| 7,604,792 | B2 | | 10/2009 | Fairchild |
| 7,780,941 | B1 | | 8/2010 | Lalancette et al. |
| 7,820,225 | B2 | * | 10/2010 | Zuniga ............... C01D 3/08 426/471 |
| 7,887,776 | B2 | | 2/2011 | Finkelshtein et al. |
| 8,409,542 | B2 | | 4/2013 | Lalancette et al. |
| 2002/0114759 | A1 | | 8/2002 | Cabello-Fuentes |
| 2007/0265466 | A1 | * | 11/2007 | Dugal ............... C01B 7/04 560/347 |
| 2012/0321547 | A1 | * | 12/2012 | Lalancette ............... C01D 5/00 423/552 |
| 2014/0346260 | A1 | * | 11/2014 | Kaps ............... B01J 2/22 241/3 |
| 2016/0046534 | A1 | * | 2/2016 | Dietrich ............... A01G 22/00 47/58.1 R |
| 2016/0340263 | A1 | | 11/2016 | Lalancette |

FOREIGN PATENT DOCUMENTS

| | | | |
|---|---|---|---|
| CA | 879581 | | 8/1971 |
| CA | 931325 | | 8/1971 |
| CA | 938081 | | 12/1973 |
| CA | 1142324 | | 3/1983 |
| CA | 2040109 | | 10/1991 |
| CA | 2464642 | | 5/2003 |
| CA | 2248474 | | 11/2008 |
| CA | 2661479 | | 7/2013 |
| CA | 2892542 | A1 | 11/2016 |
| CN | 103395796 | * | 8/2013 |
| CN | 104016757 | * | 9/2014 |
| DE | 2029984 | | 12/1971 |
| JP | 54153162 | * | 5/1978 |
| JP | 57-129823 | | 8/1982 |
| RU | 2038301 | * | 6/1995 |
| WO | 2012/171117 | A1 | 12/2012 |
| WO | 2016/187688 | A1 | 12/2016 |

OTHER PUBLICATIONS

Shreve, N.R., Mannheim process, Chemical Process Industries, McGraw-Hill, 3rd edition, 1967, p. 346.

Remy, H., Treatise on Inorganic Chemistry, vol. 1—Intrudouction and Main Groups of the Periodic Table, Elsevier Publishing Company (1956), p. 199.

International Search Report and Written Opinion dated Jul. 16, 2012 of International Application No. PCT/CA2012/050253 (WO2012/171117 A1).

International Search Report and Written Opinion dated Jan. 27, 2016 of International Application No. PCT/CA2015/050464 (WO2016/187688 A1).

* cited by examiner

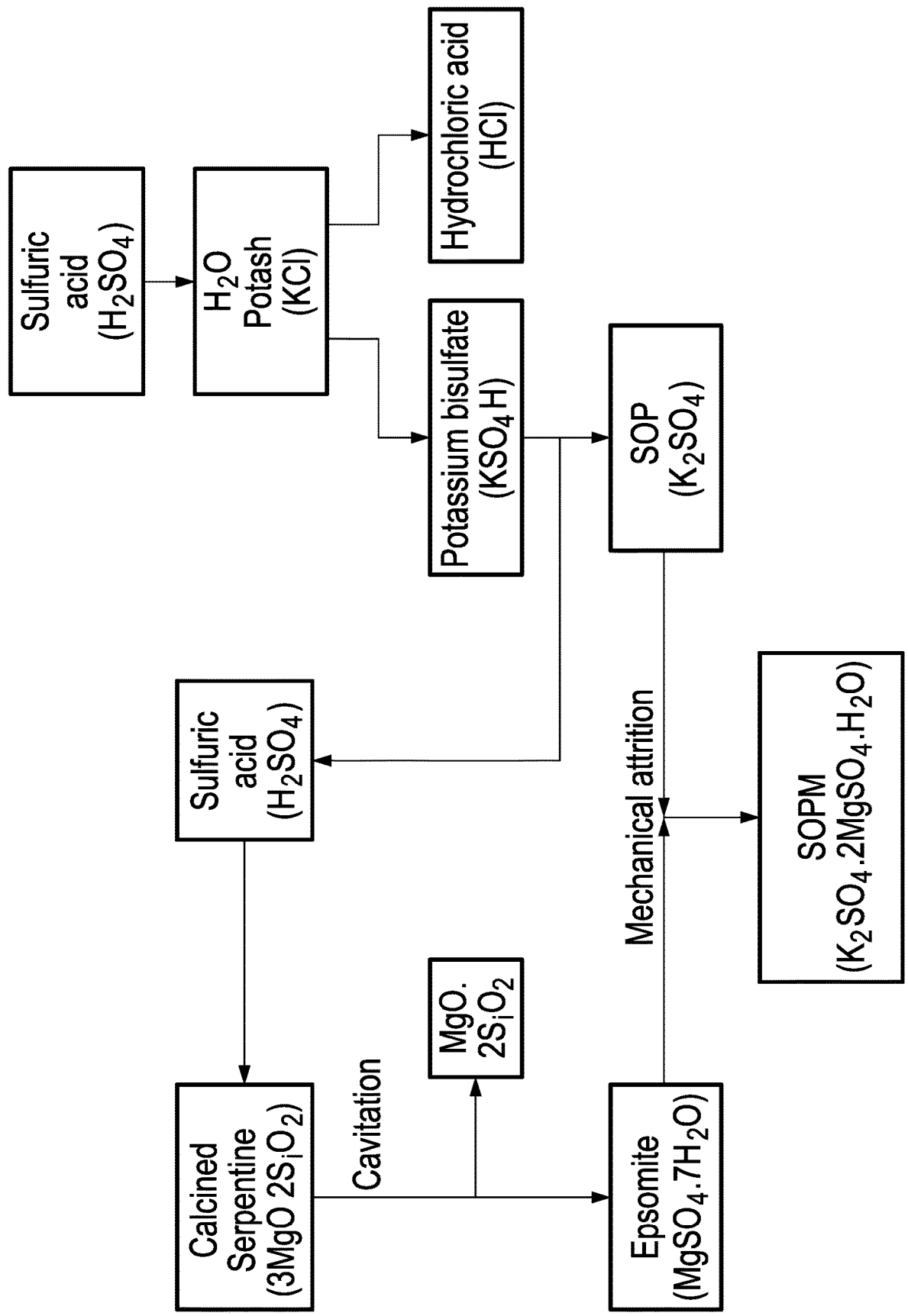

POTASSIUM MAGNESIUM FERTILIZER

CROSS REFERENCE TO RELATED APPLICATIONS

This application claims benefit of Canadian application Serial No. 2,968,257, filed on May 24, 2017. All documents above are incorporated herein in their entirety by reference.

FIELD OF THE INVENTION

The present disclosure relates to fertilizers. More specifically, the present disclosure is concerned with production of potassium magnesium sulfate.

BACKGROUND OF THE INVENTION

Potassium is an essential component in fertilizers. In the case of intensive cultures requiring frequent applications of fertilizer, potassium chloride (KCl), also referred to as potash, which is the most abundant source of potassium, is not suitable because chloride can lead to soil sterilization if present in too large amounts. Thus, potassium sulfate ($K_2SO_4$) is preferred to potassium chloride, the sulfate group having a positive agronomic value per se.

Since magnesium is also an element required by some crops such as tobacco, potatoes or corn for example, it has been found useful to use a naturally occurring double sulfate of potassium and magnesium, such as langbeinite ($K_2SO_4.2MgSO_4$), known as SOPM.

To meet an increasing use of SOMP, and in view of the depletion of natural sources thereof, synthetic potassium sulfate is now typically mixed with magnesium sulfate to duplicate naturally occurring SOPM. But mere mixing of the components does not lead to an end product having the required physical properties of the naturally occurring true double salt. When using a solution of the components, leonite rather than langbeinite crystallizes out, with a K/Mg ratio of 2/1 rather than 1/1.

In view of the relatively high pricing of potassium sulfate and the desired chemical and physical properties of SOPM such as absence of chlorides, hardness and particle size, new methods for obtaining SOPM from much cheaper potash and a low-cost source of magnesium have been developed. A method for the formation of SOPM comprising the reaction of potassium acid sulfate $KHSO_4$ on a source of magnesium ($3MgO.2SiO_2.2H_2O$) has been presented (WO2016/187688A1). Another method to SOPM via magnesium chloride is also known (Canadian patent 2,611,479). However, these methods led to problems with K/Mg ratio control and separation of phases, along with large water handling due in part to the hydrated state of the source of magnesium. Preparation of potassium sulfate from potassium chloride via magnesium sulfate has also been reported (U.S. Pat. No. 8,409,542).

Therefore, there is a need in the art for a method for producing potassium magnesium fertilizer.

SUMMARY OF THE INVENTION

More specifically, in accordance with the present disclosure, there is provided a method for producing a double sulfate of potassium and magnesium by dry mechanical attrition of potassium sulfate and magnesium sulfate hexahydrate, comprising obtaining potassium sulfate by sulfatation of potash to bisulfate of potassium and disproportionation of the bisulfate of potassium to potassium sulfate in a water-methanol solution, and obtaining magnesium sulfate hexahydrate by sonic-assisted partial sulfatation of calcined serpentinic silicate.

There is further provided a method for producing a double sulfate of potassium and magnesium with a molar potassium-magnesium ratio of 1.0±0.05 using potash, calcined serpentinic silicate and sulfuric acid as starting materials, comprising a solid-solid reaction between potassium sulfate and magnesium sulfate hexahydrate, wherein the potassium sulfate is obtained by reacting sulfuric acid with the potash followed by disproportionation of a resulting potassium bisulfate to potassium sulfate and sulfuric acid in a water-methanol mixture; and the magnesium sulfate heptahydrate is obtained by cavitation-assisted sulfatation of the calcined serpentinic silicate.

There is further provided a method for producing a double sulfate of potassium and magnesium, comprising submitting potassium sulfate and magnesium sulfate to a solid-solid reaction.

Other objects, advantages and features of the present disclosure will become more apparent upon reading of the following non-restrictive description of specific embodiments thereof, given by way of example only with reference to the accompanying drawings.

BRIEF DESCRIPTION OF THE DRAWINGS

In the appended drawings:

FIG. 1 is a schematic diagram of a method according to an embodiment of an aspect of the present disclosure.

DESCRIPTION OF EMBODIMENTS OF THE INVENTION

In a nutshell, there is provided a method for producing a potassium-magnesium fertilizer from potash and serpentinic silicate.

According to an embodiment of an aspect of the present disclosure illustrated in the diagram of FIG. 1, the method comprises forming potassium sulfate SOP ($K_2SO_4$) from potash (KCl), forming magnesium sulfate ($MgSO_4$) from dehydrated magnesium silicate, and combing the two resulting sulfated metals in equimolar proportions to yield SOPM.

Formation of Potassium Sulfate SOP ($K_2SO_4$)

Sulfuric acid ($H_2SO_4$) 93% w/w is reacted with potash (KCl) at a temperature in a range between 120 and 140° C., yielding potassium bisulfate ($KSO_4H$) and hydrochloric acid (HCl) (see U.S. Pat. No. 4,588,573A). The evolution of chlorine as hydrochloric acid is essentially complete. The resulting potassium bisulfate ($KSO_4H$) is dissolved with a minimum amount of water and the volume of this solution is doubled with methanol ($CH_3OH$) at a temperature in a range between 25 and 30° C.; due to the insolubility of potassium sulfate in the water-methanol mixture, the potassium bisulfate ($KSO_4H$) disproportionates into potassium sulfate ($K_2SO_4$), which precipitates, and sulfuric acid ($H_2SO_4$), which remains in solution in the water-methanol mixture. Solid potassium sulfate ($K_2SO_4$) is recovered with 99% w/w of the potassium of the starting potash and less than 0.1% w/w of the chloride in the solid phase (precipitate). The methanol ($CH_3OH$) in the sulfuric acid water-methanol mixture can be recovered by distillation, and sulfuric acid ($H_2SO_4$), of a concentration of about 20-30% w/w sulfuric acid, can be directed to the formation of magnesium sulfate ($MgSO_4$) as will be described hereinbelow.

Thus, a potassium sulfate deprived of chloride is obtained from potassium chloride (potash (KCl)) with recovery of hydrochloric acid and recycling of sulfuric acid resulting from the disproportionation of bisulfate of potassium, as per relations (1) below:

(1) Formation of $K_2SO_4$ from KCl

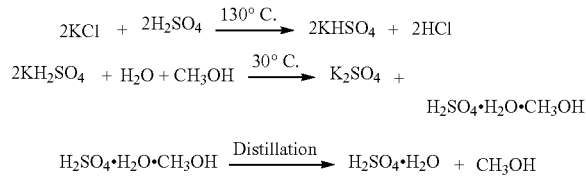

Formation of Magnesium Sulfate ($MgSO_4$).

The source of magnesium is serpentinic silicate of general formula $3MgO \cdot 2SiO_2 \cdot 2H_2O$ with iron contaminant at the level of 6% along with traces of nickel, chromium, aluminum and manganese. The tailings is first calcined, i.e. submitted to a thermal treatment at about 700° C., to remove the 13% w/w of structural water; this thermal treatment improves greatly the reactivity, oxidize the iron contaminant to ferric state and destroy traces amounts of chrysotile fibers remaining in these tailings of serpentinic silicates as described in the art (CA 2,248,474).

The iron content of the resulting anhydrous magnesium silicate $3MgO \cdot 2SiO_2 \cdot 0.1 Fe_2O_3$ is then reduced to 4% by demagnetisation.

The sulfatation of this magnesium silicate then uses sulfuric acid ($H_2SO_4$), of a concentration of about 20-30% w/w sulfuric acid, recycled from the formation of potassium sulfate described hereinabove, as per relation 2 below, yielding a slurry of 30% solid in an acid 20-30% w/w of sulfuric acid. With such a weak acid the reaction is expected to be slow and incomplete, even at high temperature. Surprisingly, it was found that cavitation near ambient temperature, i.e. at a temperature in a range between 30 and 50° C. and under a pressure of 20-25 psi, allowed the reaction to proceed efficiently and rapidly. The ratio of acid/calcined serpentine is adjusted to extract two of the three atoms of magnesium in the magnesium silicate $3MgO \cdot 2SiO_2$. After a 30-min contact time, more than 95% of the initial sulfuric acid is reacted. pH adjustment using MgO and filtration yields a neutral and clean solution of magnesium sulfate at pH 6. The residual $MgO \cdot 2SiO_2$ along with precipitated iron hydroxide is then easily filtered with no difficulties was met with silica filtration when magnesium is completely dissolved.

The solution of magnesium sulfate is then evaporated by distillation to crystallize out magnesium sulfate as an heptahydrate, i.e. Epson salt: $MgSO_4 \cdot 7H_2O$. The residual solid is discarded as an insoluble and inert material.

(2) Formation of $MgSO_4 \cdot 7H_2O$ from Calcined Serpentine

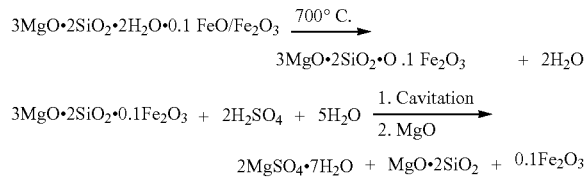

Thus, magnesium sulfate ($MgSO_4$) is obtained from dehydrated magnesium silicate.

Production of Sulfate of Potassium and Magnesium (SOPM)

It was found that mechanical attrition of the two solid components, i.e. one mole of potassium sulfate with two moles of hydrated magnesium sulfate, was very efficient. It was discovered that such a dry mechanical treatment, such as ball milling for example, facilitates greatly the formation of the double salt, and that the resulting double salt is much less hydrophilic than the starting magnesium sulfate as the water liberated from the Epsom salt transforms the solid mixture into a slurry. This slurry may then be partly dried at 150° C. to the consistency of a thick paste and then pelletized with a standard rotation pelletizer into particulates approximately spherical and having a desired diameter, for example in a range between about 5 and about 7 mm. The pellets can then be then dried at 200° C. to yield SOPM with a formulation corresponding to $K_2SO_4 \cdot 2MgSO_4 \cdot 1H_2O$. Relation 3 below describes the formation of SOPM from $K_2SO_4$ and $MgSO_4 \cdot 7H_2O$.

(3) Formation of SOPM

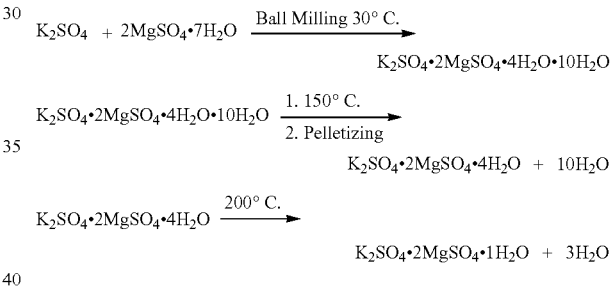

A chloride-free double sulfate of potassium and magnesium of the langbeinite structure was thus obtained starting from potash and serpentinic silicate. Moreover, the obtained material is shaped at a dimension ensuring it does not break at a free fall of 3 meters and is not dusty, allowing easy blending and field applications. If heating is conducted at 250°, the anhydrous double sulfate is obtained.

The following non-limitative examples describe implementations of the method.

For the formation of potassium sulfate, in a one liter three necks flash, 29.82 g (0.4 mole) of KCl were treated with 42.6 g (0.4 mole at 92% w/w) of sulfuric acid by slow addition over 30 minutes. The evolution of HCl was brisk and directed via a condenser to a collecting flash kept at 0° C. with an ice/salt bath. After addition of the sulfuric acid, the reacting mixture, under mechanical stirring, was treated with water addition, 25 ml over a period of 45 minutes at 130° C. By titration, the total evolution of HCl was then 14.3 g close to the theoretical amount of 14.58 g.

The solid in the reaction flask was cooled to 30° C. and dissolved in 100 ml of water. To this stirred solution, 100 ml of methanol at 30° C. was added slowly, over five minutes. The precipitated potassium sulfate was filtrated and rinsed with methanol (2 displacements).

The yield of the reaction was 98.1% w/w of the expected $K_2SO_4$, with only 0.003% w/w of chlorides. After recovery of methanol from the filtrate by distillation, the water-sulfuric acid solution contained 96% w/w of the expected acid.

For the formation of magnesium sulfate, the serpentinic silicate used as a source of magnesium ($3MgO.2SiO_2.2H_2O.0.1\ FeO/Fe_2O_3$) was calcined at 700° C., reduced in size to 80% minus 100 mesh and demagnetized (1,100 Gauss). This anhydrous magnesium silicate (284.3 g) was reacted with 196.1 g of sulfuric acid (30% w/w $H_2SO_4$) giving a slurry of 30% w/w solid. The reaction was achieved by circulating this slurry through a cavitation tube (20 psi, 5 gal/min) at 30° C. for ten minutes. The filtration of the reaction after neutralization with 13 g of MgO mixture yield 170 g of unreacted solid. The soluble fraction, after evaporation at 50° C. under vacuum yield 496 g of a white solid, $MgSO_4.7H_2O_3$ corresponding to the extraction of two of the three magnesium atoms of the starting magnesium silicate.

For the formation of double sulfate of potassium and magnesium, a dry mixture of 174.27 g of $K_2SO_4$ and 492 g of $MgSO_4.7H_2O$ was placed in a 5-liter ball mill with 0.5 liter of cylindrical ball 1 cm in diameter by 1 cm. The milling was done for 30 minutes at 25° C. During this treatment, the initial dry mixture turned wet by the release of water from the highly hydrated magnesium sulfate. The reaction mixture was decanted over a screen to separate the cylindrical balls with a minimum rinsing and the resulting slurry was evaporated to a paste texture, at 150° C. amendable to pelletizing. The paste was then pelletized in a rotary pelletizer (Zhengzhou Weslite Machinery Equipment Co) to produce green pellets, which were further dried at 200° C. for hardening. These pellets 5 to 6 mm in diameter could withstand a 3 meter fall on a hard surface without breaking and had a composition corresponding to $K_2SO_4.2MgSO_4.1H_2O$. A further heating at 250° yield the anhydrous double sulfate.

There is thus provided a method for producing a double sulfate of potassium and magnesium with a molar potassium-magnesium ratio of 1.0±0.05 using potash, calcined serpentinic silicate and sulfuric acid as starting materials and forming the desired double sulfate by a solid-solid reaction between potassium sulfate and magnesium sulfate hexahydrate.

The method comprises obtaining the potassium by the action of sulfuric acid on potash followed by the disproportionation of the potassium bisulfate to potassium sulfate and sulfuric acid in a water-methanol milieu.

The method comprises the preparation of magnesium sulfate heptahydrate by the cavitation assisted sulfatation of calcined serpentinic silicate.

The method comprises the formation of a double sulfate of potassium and magnesium of the langbeinite type by mechanical attrition of a dry mixture of potassium sulfate and magnesium sulfate hexahydrate followed by partial dehydration, pelletizing and drying at 200° C.

There is provided a method for producing a double sulfate of potassium and magnesium by dry mechanical attrition of $K_2SO_4$ and $2MgSO_4.7H_2O$ followed by pelletization, the $K_2SO_4$ being obtained by sulfatation of KCl to bisulfate of potassium that disproportionates to $K_2SO_4$ in water-methanol milieu and the $MgSO_4.7H_2O$ being obtained by sonic assisted partial sulfatation of calcined serpentinic silicate.

It can be appreciated that a more direct approach to potassium sulfate and to SOPM is desirable to circumvent the limitations of mere mixing of species, sulfating with bisulfate or preparing $K_2SO_4$ via $MgSO_4$ or $MgCl_2$.

The scope of the claims should not be limited by the embodiments set forth in the examples, but should be given the broadest interpretation consistent with the description as a whole.

The invention claimed is:

1. A method for producing a fertilizing double sulfate of potassium and magnesium, comprising producing potassium sulfate by reacting sulfuric acid with potassium chloride followed by reaction with wet methanol yielding precipitated potassium sulfate and dilute sulfuric acid of a concentration of from 20 to 30% w/w from said reaction, producing magnesium sulfate using the dilute sulfuric acid by cavitation-assisted sulfatation of calcined serpentinic silicate, and dry mechanical attrition of the potassium sulfate and the magnesium sulfate, wherein said producing the magnesium sulfate comprises calcining serpentinic silicate, reacting a resulting anhydrous magnesium silicate with sulfuric acid of a concentration of about 20-30% w/w acid under cavitation at a temperature in a range from 30 to 50° C., at a pressure in a range from 20 to 25 psi, neutralizing, filtration and distillation.

2. The method of claim 1, wherein said dry mechanical attrition of potassium sulfate and magnesium sulfate comprises mechanical attrition of a dry mixture of the potassium sulfate and magnesium sulfate hexahydrate.

3. The method of claim 1, wherein said dry mechanical attrition of potassium sulfate and magnesium sulfate comprises mechanical attrition of a dry mixture of the potassium sulfate and magnesium sulfate hexahydrate, the method further comprising partial dehydration, pelletizing and drying.

4. The method of claim 1, wherein the double sulfate of potassium magnesium sulfate has a molar potassium-magnesium ratio of 1.0±0.05.

5. The method of claim 1, wherein said producing the potassium sulfate further comprises recovering methanol by distillation and recycling the resulting dilute sulfuric acid.

6. The method of claim 1, comprising producing the potassium sulfate by reacting sulfuric acid with potassium chloride in the form of potash.

* * * * *

UNITED STATES PATENT AND TRADEMARK OFFICE
CERTIFICATE OF CORRECTION

PATENT NO. : 11,021,411 B2
APPLICATION NO. : 15/975664
DATED : June 1, 2021
INVENTOR(S) : Jean-Marc Lalancette and David Lemieux It is certified that error appears in the above-identified patent and that said Letters Patent is hereby corrected as shown below:

In the Specification

Column 3 - Line 11 change:
"$2KH_2SO_4 + H_2O$"
To:
"$2KHSO_4 + H_2O$"

Signed and Sealed this
Twenty-fourth Day of May, 2022

Katherine Kelly Vidal
*Director of the United States Patent and Trademark Office*